United States Patent [19]
Cox

[11] Patent Number: 5,125,611
[45] Date of Patent: Jun. 30, 1992

[54] VEHICLE SEAT ADJUSTER WITH CRASH BARS

[75] Inventor: David C. Cox, Rockford, Ill.

[73] Assignee: Atwood Industries, Inc., Rockford, Ill.

[21] Appl. No.: 658,044

[22] Filed: Feb. 20, 1991

[51] Int. Cl.$^5$ ........................... F16M 13/00
[52] U.S. Cl. ................... 248/429; 248/420; 297/473
[58] Field of Search ............ 248/393, 394, 395, 420, 248/429, 430; 297/473

[56] References Cited

U.S. PATENT DOCUMENTS

| | | | |
|---|---|---|---|
| 4,072,347 | 2/1978 | Boisset | 248/429 X |
| 4,248,480 | 2/1981 | Koucky et al. | 297/473 |
| 4,486,047 | 12/1984 | Nagashima | 248/429 X |
| 4,676,555 | 6/1987 | Tokugawa | 297/473 |
| 4,676,556 | 6/1987 | Yamanoi et al. | 297/473 |
| 4,729,602 | 3/1988 | Tokugawa | 297/473 X |
| 4,776,551 | 10/1988 | Nishino | 248/429 |
| 4,804,229 | 2/1989 | Nishino | 297/473 X |
| 4,881,781 | 11/1989 | Borlinghaus et al. | 297/473 |
| 4,923,214 | 5/1990 | Siegrist et al. | 297/473 X |

FOREIGN PATENT DOCUMENTS

| | | | |
|---|---|---|---|
| 2826634 | 1/1980 | Fed. Rep. of Germany | 297/473 |
| 3312480 | 10/1984 | Fed. Rep. of Germany | 297/473 |
| 1279881 | 12/1986 | U.S.S.R. | 297/473 |
| 2183988 | 6/1987 | United Kingdom | 297/473 |

*Primary Examiner*—David L. Talbott
*Attorney, Agent, or Firm*—Leydig, Voit & Mayer, Ltd.

[57] ABSTRACT

The track assembly of a seat adjuster is formed by upper and lower tracks of inverted U-shaped cross-section with the lower track being nested in the upper track and with the rear end portion of the upper track serving as an anchor for a seat belt. A tubular sheath of anti-friction material is located between the tracks to promote gliding of the upper track on the lower track. Crash bars with longitudinally spaced teeth on their lower edges are housed within and anchored to the lower track. If the vehicle is involved in a frontal crash, load exerted by the seat belt on the upper track causes the rear end portion of the upper track to buckle upwardly and bring a latch on the lower side of the upper track into latching relation with the teeth of the crash bars for purposes of locking the upper track against upward and forward movement relative to the lower track. The bottom of the sheath normally holds the latch out of latching relation with the teeth and yields under a crash condition to allow the latch to move into latching relation with the teeth.

9 Claims, 5 Drawing Sheets

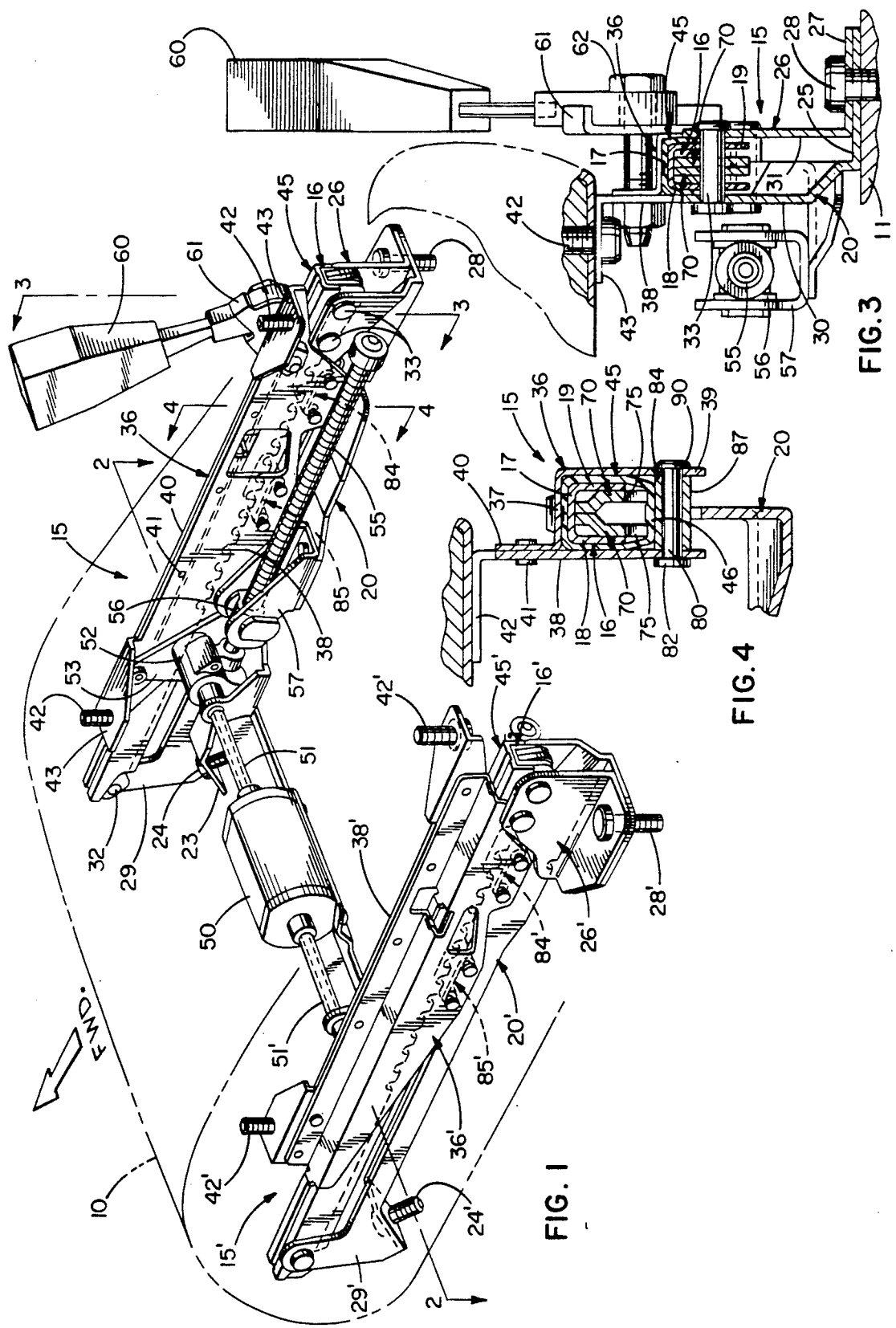

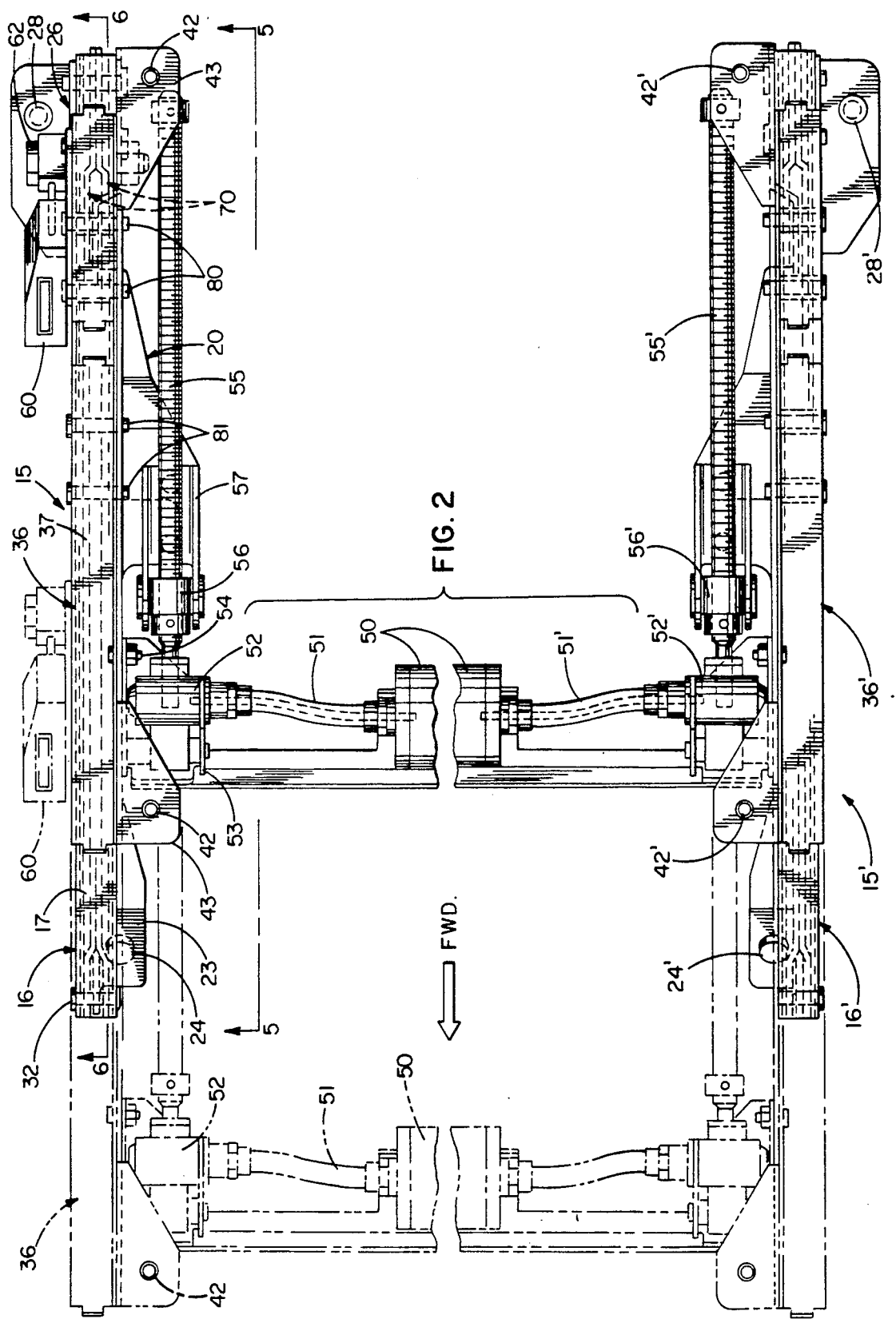

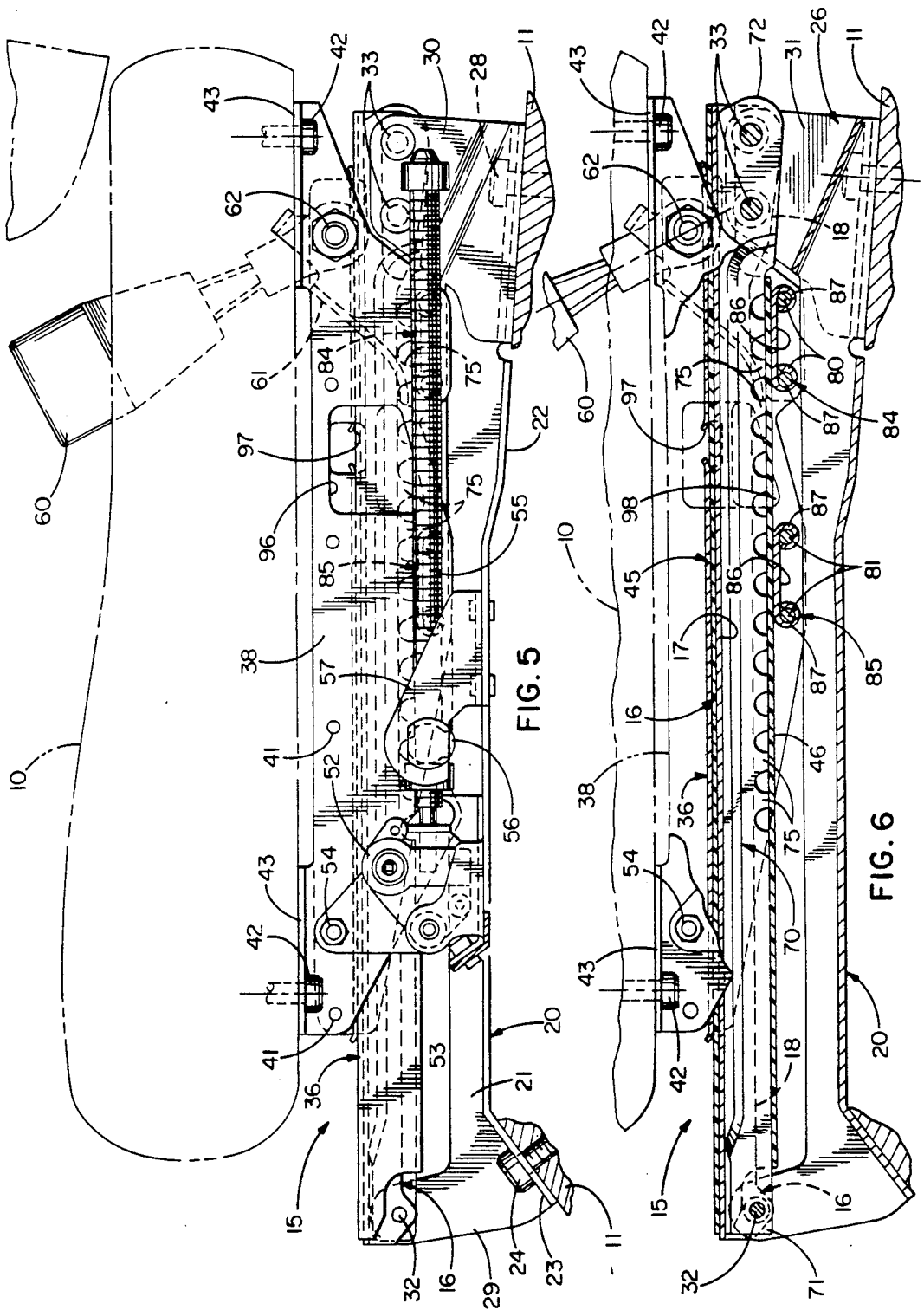

VEHICLE SEAT ADJUSTER WITH CRASH BARS

BACKGROUND OF THE INVENTION

This invention relates to a seat adjuster or track assembly for supporting a vehicle seat for selective back and forth adjustment in the passenger compartment of the vehicle.

Typically, the front seat of a vehicle is supported by two adjustable track assemblies, there being one track assembly beneath the seat along each side thereof. Each assembly includes an upper track secured to the lower side of the seat and supported on a lower-track to move back and forth in the passenger compartment. The lower track is anchored to the floor pan of the vehicle.

In modern seat adjusters, a seat belt anchor is attached to the rear end portion of the upper track, usually by means of a bracket, and serves as an anchor point for the strap of a seat belt. As a result of anchoring the seat belt to the upper track, the seat belt adjusts back and forth with the seat so as to increase the comfort of the passenger. When a frontal crash occurs, however, the upwardly and forwardly directed load imposed by the passenger against the seat belt is transmitted to the upper track and tends to move the upper track upwardly and forwardly relative to the lower track. Movement of the upper track relative to the lower track must be restrained during a crash in order to reduce the chances of passenger injury. In manually adjustable track assemblies, the selectively operable latch which normally holds the seat in a fixed position also restrains forward movement of the seat during a crash.

The present invention more particularly relates to a power-operated seat adjuster in which back and forth adjustment of the seat is effected by an electrically operated motor. Power-operated seat adjusters are not equipped with selectively operable latches for holding the seat in a fixed position and thus other means must be provided for restraining movement of the seat during a crash.

SUMMARY OF THE INVENTION

The general aim of the present invention is to provide a new and improved seat adjuster in which a so-called crash bar is compactly packaged within the lower track of the track assembly and serves to latch the upper track in a fixed position under an impact condition.

A more detailed object of the invention is to house the crash bar within the lower track and within an antifriction sheath which supports the upper track for back and forth sliding on the lower track. When a crash occurs, the upper track buckles to permit a latch on the lower side of the upper track to either break through or deform the sheath and lock against the crash bar thereby to prevent movement of the upper track and the seat relative to the lower track.

The invention also resides in the unique construction enabling the latch to remain inoperative during normal conditions and promoting buckling of the upper track under a crash condition so as to enable the latch to move into latching relation with the crash bar.

These and other objects and advantages of the invention will become more apparent from the following detailed description when taken in conjunction with the accompanying drawings.

BRIEF DESCRIPTION OF THE DRAWINGS

FIG. 1 is a perspective view showing a vehicle seat equipped with new and improved seat adjusting track assemblies incorporating the unique features of the present invention.

FIG. 2 is an enlarged top plan view of the track assemblies as seen along the line 2—2 of FIG. 1.

FIGS. 3 and 4 are enlarged fragmentary cross-sections taken substantially along the lines 3—3 and 4—4, respectively, of FIG. 1.

FIG. 5 is a side elevational view of one of the track assemblies as seen along the line 5—5 of FIG. 2.

FIG. 6 is a fragmentary cross-section taken substantially along the line 6—6 of FIG. 2.

DETAILED DESCRIPTION OF THE PREFERRED EMBODIMENT

Figure 7:
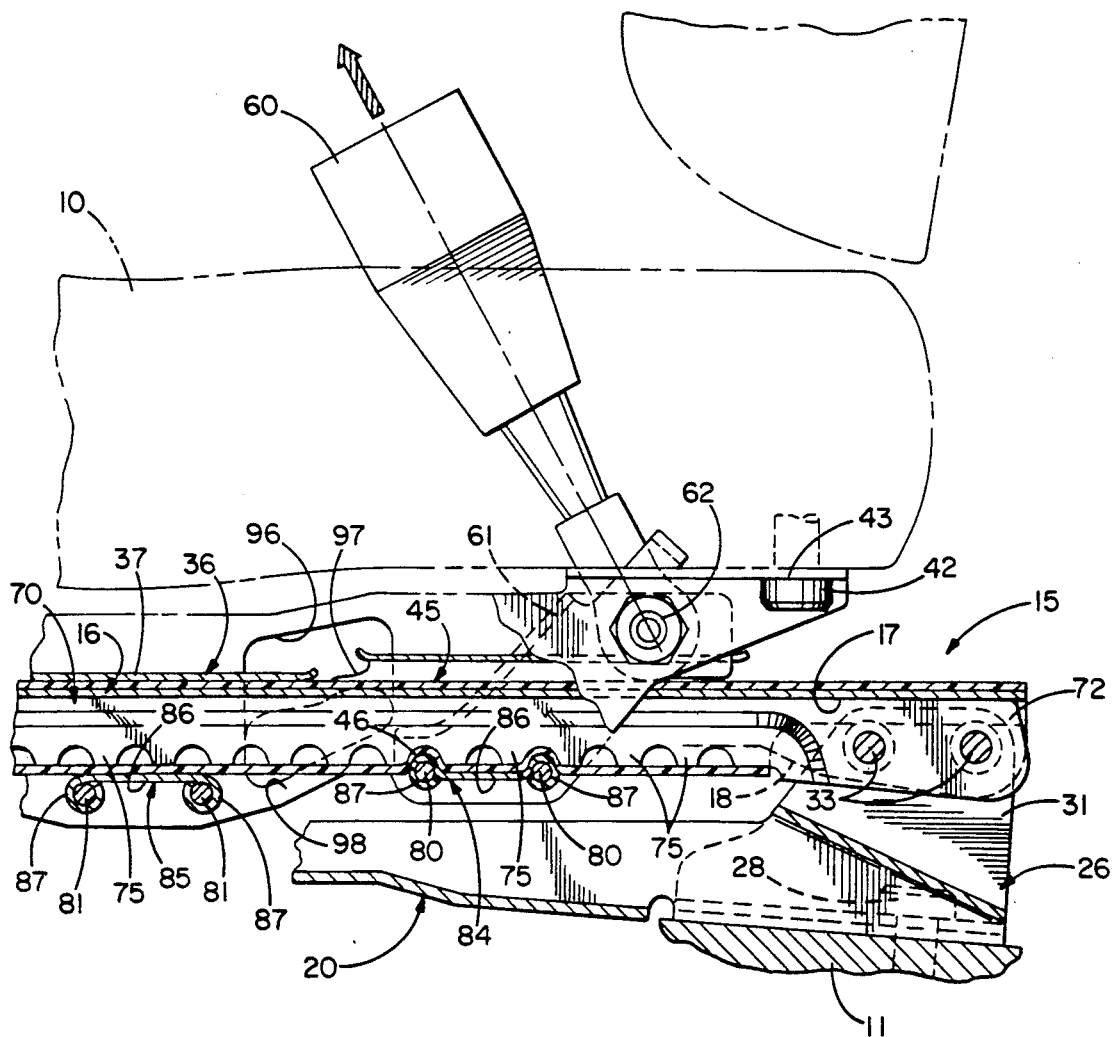
FIG. 7 is an enlarged fragmentary view generally similar to FIG. 6 but shows the track assembly following a crash.

For purposes of illustration the invention has been shown in the drawings as embodied in means for mounting a vehicle seat 10 on the floor pan 11 (FIG. 3) of the vehicle and enabling selective back and forth adjustment of the seat in the passenger compartment. The mounting means comprise two longitudinally extending track assemblies 15 and 15' located beneath and extending along the right and left sides, respectively, of the seat. The two track assemblies are virtually identical except for hand and thus only the right assembly 15 has been shown and will be described in detail.

Figure 9:
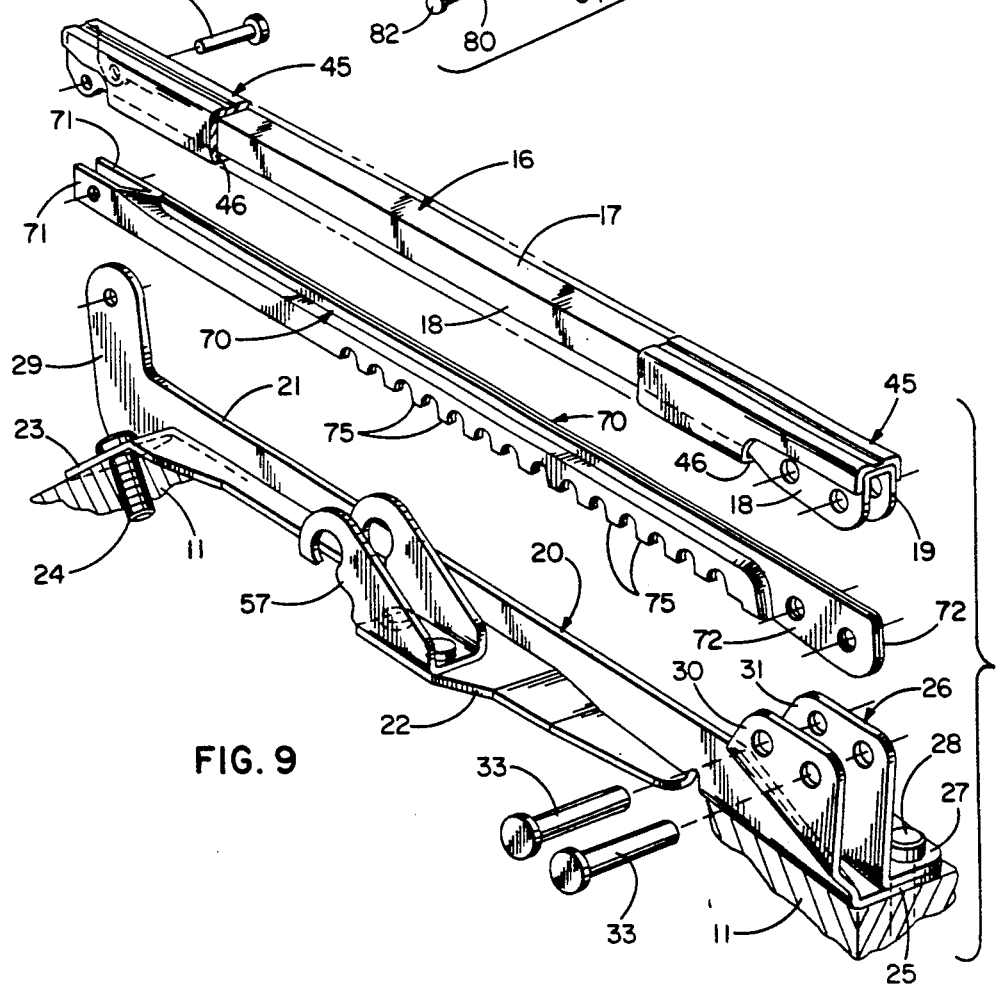
FIG. 9 is an exploded perspective view of the components of the lower track assembly.

The track assembly 15 includes a lower track 16 made of steel and formed by a channel which is of generally inverted U-shaped cross-section. The lower track is defined by a generally horizontal upper plate 17 (FIGS. 4 and 9) and by two generally vertical and laterally spaced side plates 18 and 19 formed integrally with and depending from the top plate.

A mounting bracket 20 (FIG. 9) secures the lower track 16 rigidly to the floor pan 11. As shown most clearly in FIG. 9, the mounting bracket includes an elongated metal strip 21 disposed in a generally vertical plane and extending alongside the side wall 18 of the lower track 16. A flange 22 (FIG. 9) projects generally horizontally from one side of the strip 21 and, at its forward end, is formed with a downwardly inclined portion 23 which receives a screw 24 for anchoring the mounting bracket to the floor pan. A flange 25 (FIG. 3) projects laterally opposite of the flange 22 at the rear portion of the strip 21 and rests on the floor pan. An L-shaped mounting bracket 26 is located near the rear of the track 16 adjacent the side plate 19 thereof and includes a flange 27 which overlies the flange 25. A bolt 28 extends through the flanges 27 and 25 and is threaded into the floor pan 11 to secure the bracket 26 and the rear end portion of the bracket 20 to the floor pan.

The front and rear end portions of the mounting bracket 20 are formed with upstanding ears 29 and 30 (FIG. 9), respectively. The mounting bracket 26 is formed with an ear 31 integral with and upstanding from the flange 27 and spaced laterally from the ear 30. When the lower track 16 is assembled with the mounting brackets 20 and 26, the side plates 18 and 19 of the track straddle the ear 29 and are located between the ears 30 and 31. A rivet 32 fastens the forward end portion of the track 16 to the ear 29 while two rivets 33 fasten the rear end portion of the track to the ears 30 and 31.

As shown most clearly in FIG. 4, the track assembly includes an upper track 36 which also is of generally inverted U-shaped cross-section. The upper track is defined by a generally horizontal top plate 37 and by two laterally spaced side plates 38 and 39 (FIGS. 4 and 8) which depend from the top plate 37. The side plate 39 is formed integrally with the top plate 37 while the side plate 38 is formed separately of the top plate 37. An upwardly projecting flange 40 which is integral with the top plate 37 is disposed face-to-face with the side plate 38 and is secured thereto by rivets 41 so as to join the plate 38 rigidly to the plates 37 and 39. Bolts 42 extend through horizontal flanges 43 at the front and rear end portions of the plate 38 and anchor the seat 10 to the upper track 36.

When the two tracks 16 and 36 are assembled, the lower track 16 nests within the upper track 36 and is located with its plates 17, 18 and 19 disposed in face-to-face relation with the corresponding plates 37, 38 and 39 of the upper track. To enable the upper track 36 to move freely back and forth along the lower track, a sheath 45 (FIGS. 4 and 9) of anti-friction material such as ultra high molecular weight polyethylene is located between the tracks and is bonded or otherwise secured to the lower track. The sheath 45 is of inverted U-shaped cross-section at its front and rear end portions and is tubular and of rectangular cross-section along the rest of its length. The horizontal top wall and the vertical side walls of the sheath form a glide surface of reduced friction for the upper track 36. For a purpose to be explained subsequently, the tubular portion of the sheath 45 includes a bottom wall 46 (FIGS. 4, 6 and 7) which extends laterally beneath the side plates 18 and 19 of the lower track 16 in downwardly spaced relation with the lower edges of the side plates.

In the present instance, the seat adjuster is power-operated in that the upper track 36 of each track assembly 15, 15' is adjusted along the lower track 16 thereof in response to energization of a reversible electric motor 50 (FIGS. 1 and 2). The motor is centered between the two track assemblies and includes a rotatable shaft 51 extending laterally toward the assembly 15. The shaft is operable to drive a right angle gear unit 52 supported by a bracket 53 (FIG. 8) which is fixed to the side plate 38 of the upper track 36 by bolts 54 which coact with the rivets 41 to secure the flange 40 to the side plate 38. The gear unit, in turn, is operable to rotate a longitudinally extending lead screw 55 (FIGS. 1 and 2) which is threaded through a non-rotatable nut 56 held in a U-shaped bracket 57 (FIG. 9) on the flange 22 of the mounting bracket 20. When the screw 55 is rotated by the motor 50 acting through the gear unit 52, the screw translates in the nut 56 to shift the upper track 36 forwardly or rearwardly along the lower track 16 and thereby effect power adjustment of the seat 10.

Figure 8:
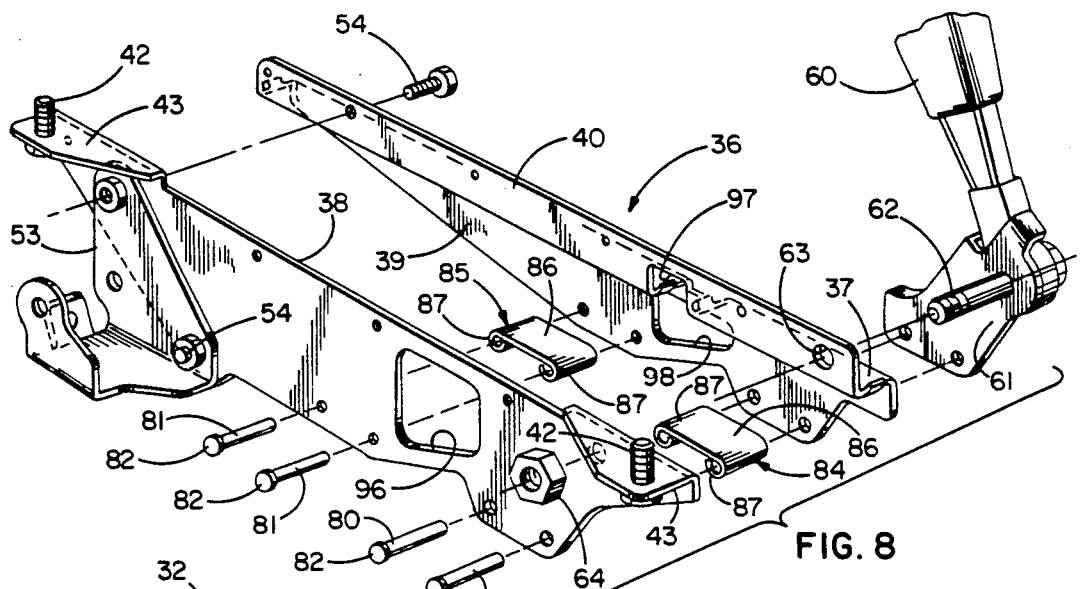
FIG. 8 is an exploded perspective view of the components of the upper track of the track assembly.

Advantageously, the female retainer 60 (FIGS. 2 and 3) of the safety belt system of the vehicle is anchored to and is adjustable with the upper track 36 in order to avoid the need for adjusting the effective length of the safety belt when the seat 10 is adjusted. As shown in FIG. 8, the retainer 60 is carried by a bracket 61 which is fastened to the rear end portion of the upper track 36 by means of a bolt 62 extending through a hole 63 in the flange 40 and secured by a nut 64 on the inboard side of the plate 38. The bolt 62 also helps secure the flange 40 to the plate 38.

While anchoring of the seat belt retainer 60 to the adjustable track 36 provides passenger comfort and convenience, heavy loads are imposed on the track assembly 15 if the vehicle is involved in a severe frontal crash. In such an instance, the force of the passenger against the seat belt imposes a heavy upwardly and forwardly directed load on the upper track 36 by way of the belt retainer 60 and the anchoring bolt 62. If such load causes the upper track 36 and the seat 10 to break away from the lower track 16, the chances of the passenger suffering a serious injury are increased.

In accordance with the present invention, crash bars 70 (FIGS. 7 and 9) are secured to and are compactly nested within the lower track 16 and coact with latching means on the upper track 36 to lock the upper track to the lower track in the event a heavy upwardly and forwardly directed load is imposed on the upper track. In this way, the chances of the seat 10 moving through any significant distance relative to the lower track during a frontal crash are substantially reduced. Because the crash bars are located within the otherwise unused space in the lower track, the crash bars do not encumber the lateral space outside of the tracks 16 and 36.

Preferably, two crash bars 70 are located in face-to-face relation within the lower track 16. Each crash bar is formed from an elongated piece of steel having a forward mounting ear 71 (FIG. 9) and a rear mounting ear 72. The forward ears 71 of the two crash bars are located within the forward end portion of the lower track 16 between the side plates 18 and 19 thereof, straddle the ear 29 of the mounting bracket 20, and are secured rigidly to the ear 29 by the rivet 32. The rear ears 72 of the crash bars are located between the side plates 18 and 19 at the rear end portion of the track 16 and are secured to the ears 30 and 31 of the brackets 20 and 26 by the rivets 33. Thus, the crash bars are anchored rigidly with respect to the lower track 16.

As shown in FIG. 4, upper portions of the two crash bars 70 are located in face-to-face engagement while lower portions of the two bars between the ears 71 and 72 are spaced laterally from one another. In carrying out the invention, several longitudinally spaced and downwardly opening teeth 75 (FIG. 9) are formed in the lower portion of each crash bar and coact with the latching means to lock the tracks 16 and 36 together in the event of a frontal crash. The teeth are located just above the bottom wall 46 of the sheath 45.

In this instance, the latching means comprise pins secured to the upper track 36 and extending laterally beneath the bottom wall 46 of the sheath 45. Preferably, there are a rear pair of longitudinally spaced latching pins 80 (FIGS. 7 and 8) and a front pair of longitudinally spaced pins 81 spaced longitudinally from the rear pair, each pin having an enlarged head 82. The pins of the rear and front pairs are associated with rear and front spacers 84 and 85 (FIG. 8), respectively, each having a metal web 86 and having a pair of curls 87 at the ends of the web. Herein, the curls are located below the web although the curls could be located above the web.

The spacers 84 and 85 are located between the side plates 38 and 39 of the upper track 36 (see FIG. 4) and are positioned with the upper sides of their webs 86 in engagement with the lower side of the bottom wall 46 of the sheath 45. The pins 80 and 81 extend through holes in the side plate 38, through the curls 87 of the spacers 84 and 85, through holes in the side plate 39 and, in the case of the pins 80, through holes in the bracket 61. The ends of the pins opposite the heads 82 are swaged as indicated at 90 in FIG. 4 to captivate the pins axially.

During normal back and forth adjustment of the seat 10, the webs 86 of the spacers 84 and 85 simply glide along the bottom wall 46 of the sheath 45 and hold the pins 80 and 81 out of latching relation with the teeth 75 of the crash bars 70. In the event of a frontal crash, the force exerted on the seat belt retainer 60 acts through the bolt 62 and forces the rear end portion of the upper track 36 to move upwardly and forwardly, the track buckling somewhat under such force. As an incident to upward movement of the rear end portion of the upper track, the rear pins 80 and the curls 87 of the rear spacer 84 move upwardly as shown in FIG. 7 and either deform the bottom wall 46 of the sheath 45 or break through the bottom wall so as to move into latching relation with the teeth 75 of the crash bars 70. As a result of the bottom wall 46 yielding to permit the pins and the curls to move into latching relation with the teeth, the upper track 36 becomes locked to the rigidly secured crash bars 70 and is prevented from moving further either in an upward direction or in a forward direction. Thus, the risk of injury is reduced.

To help assure upward movement of the pins 80 into latching relation with the teeth 75 of the crash bars 70, the upper track 36 is weakened at strategic areas in order to promote upward buckling of the rear end portion of the track. As shown in FIG. 8, a window 96 is formed through the side plate 38 of the upper track 36 at a location between the spacers 84 and 85. A laterally spaced window or notch 97 also is formed in the flange 40 and the upper plate 37 of the upper track. Finally, an additional window 98 is formed in the side plate 39. The various windows cause the upper track 36 to buckle between the spacers 84 and 85 when an upwardly and forwardly directed force is applied to the rear end portion of the upper track and, as a result, the pins 80 and curls 87 of the rear spacer 84 may move upwardly into latching relation with the teeth 75 of the crash bar 70.

The pins 81 and curls 87 of the front spacer 85 do not perform a latching function. The front spacer does, however, prevent the forward end portion of the upper track 36 from pivoting upwardly away from the lower track 16 when the passenger leans heavily against the seat back. Tooling and material costs are saved by making the front pins 81 and spacer 85 identical to their rear counterparts 80 and 84.

From the foregoing, it will be apparent that the present invention brings to the art a new and improved seat adjuster in which the crash bars 70 are compactly housed within the upper and lower tracks 16 and 36 so as to conserve space and to locate the crash bars in an effective position along the longitudinal centerlines of the tracks. While only the power-operated mechanism for adjusting the seat 10 back and forth has been specifically disclosed, it will be appreciated that other power mechanism could be provided for raising and lowering the front and/or the rear of the seat. Also, the invention has applicability to manually actuated seat adjusters.

I claim:

1. A track assembly for supporting the seat of a vehicle on the floor pan thereof, said assembly comprising an upper track adapted to be secured to the seat, a lower track adapted to be secured to the floor pan, said upper track being movable back and forth relative to said lower track, each track being of a generally inverted U-shaped cross-section and each having a generally horizontal upper plate and two generally vertical and laterally spaced side plates joined to and extending downwardly from said upper plate, said lower track being nested in said upper track with the plates of the lower track disposed in face-to-face relation with the corresponding plates of the upper track, an elongated crash bar disposed within and secured relative to said lower track and having a lower side with a series of longitudinally spaced teeth, and latching means connected to and extending laterally between the side plates of said upper track and beneath said teeth, said latching means normally moving freely past said teeth during back and forth movement of said upper track relative to said lower track and automatically moving upwardly into latching relation with at least one of said teeth when said upper track is subjected to a severe upwardly and forwardly directed force, said latching means and said one tooth coacting to prevent upward and forward movement of said upper track relative to said lower track when said latching means is in latching relation with said one tooth.

2. A track assembly as defined in claim 1 further including a tubular sheath of anti-friction material disposed within said upper track and over said lower track and sandwiched between the plates thereof, said sheath having a lower wall underlying said teeth, the lower wall of said sheath yielding when said latching means moves into latching relation with said one tooth.

3. A track assembly as defined in claim 1 in which said latching means comprise a pin extending laterally between the side plates of said upper track and beneath said teeth.

4. A track assembly as defined in claim 1 in which said latching means comprises a pair of longitudinally spaced pins extending laterally between the side plates of said upper track and beneath said teeth, and a spacer connecting said pins and normally holding said pins out of latching relation with said teeth.

5. A track assembly as defined in claim 4 further including a second pair of longitudinally spaced pins extending laterally between the side plates of said upper track and beneath said teeth, the pins of said second pair being spaced forwardly from the pins of said first pair, and a spacer connecting the pins of said second pair and normally holding such pins out of latching relation with said teeth.

6. A track assembly as defined in claim 1 further including a second elongated crash bar disposed within and secured relative to said lower track and located in side-by-side relation with said one crash bar, said second crash bar having a series of longitudinally spaced teeth located in longitudinal alignment with the teeth of said one crash bar, said latching means normally moving freely past the teeth of said second crash bar during back and forth movement of said upper track relative to said lower track and automatically moving upwardly into latching relation with at least one tooth of the second crash bar when said upper track is subjected to a severe upwardly and forwardly directed force.

7. A track assembly as defined in claim 1 further including weakened areas in said upper track forwardly of said latching means and promoting upward and forward buckling of the rear end portion of the upper track when a severe upwardly and forwardly directed force is imposed on said rear end portion.

8. A track assembly for supporting the seat of a vehicle on the floor pan thereof, said track assembly comprising an upper track adapted to be secured to the seat, a lower track adapted to be secured to the floor pan, said upper track being movable back and forth along said lower track, each of said tracks being of a generally inverted U-shaped cross-section and each having a generally horizontal upper plate and two generally vertical and laterally spaced side plates joined to and extending downwardly from said upper plate, a tubular sheath of generally rectangular cross-section and made of anti-friction material, said sheath being located within said upper track and having an upper wall and laterally spaced side walls disposed face-to-face with the upper plate and side plates, respectively, of the upper track, said lower track being located in said sheath and disposed with its upper plate and side plates in face-to-face relation with the upper wall and side walls, respectively, of the sheath, an elongated crash bar disposed within and secured to said lower track and having a lower side with a series of longitudinally spaced teeth, said sheath having a bottom wall located beneath and normally shielding said teeth, and a latching pin connected between said side plates of said upper track and extending laterally between the bottom wall of said sheath, said latching pin normally moving freely along the bottom wall of said sheath during back and forth movement of said upper track relative to said lower track and being kept out of latching relation with said teeth by said bottom wall, said latching pin deforming the bottom wall of said sheath and moving upwardly into latching relation with at least one of said teeth when the rear end portion of said upper track is subjected to a severe upwardly and forwardly directed force, said latching pin and said one tooth coacting to prevent upward and forward movement of said upper track relative to said lower track when said latching pin is in latching relation with said one tooth.

9. A track assembly as defined in claim 8 further including weakened areas in said upper track forwardly of said latching means and promoting upward and forward buckling of the rear end portion of the upper track when a severe upwardly and forwardly directed force is imposed on said rear end portion.

* * * * *